(12) United States Patent
Bilek et al.

(10) Patent No.: US 10,629,865 B2
(45) Date of Patent: Apr. 21, 2020

(54) FEEDTHROUGH DEVICE

(71) Applicant: Energizer Brands, LLC, St. Louis, MO (US)

(72) Inventors: Kristopher Bilek, Madison, WI (US); Gregory J. Davidson, Oregon, WI (US); William C. Bushong, Madison, WI (US)

(73) Assignee: Energizer Brands, LLC, St. Louis, MO (US)

( * ) Notice: Subject to any disclaimer, the term of this patent is extended or adjusted under 35 U.S.C. 154(b) by 93 days.

(21) Appl. No.: 15/724,368

(22) Filed: Oct. 4, 2017

(65) Prior Publication Data

US 2018/0026237 A1 Jan. 25, 2018

Related U.S. Application Data

(63) Continuation of application No. 14/192,558, filed on Feb. 27, 2014, now Pat. No. 9,812,679.

(60) Provisional application No. 61/777,777, filed on Mar. 12, 2013.

(51) Int. Cl.
*H01M 2/04* (2006.01)
*H01M 2/06* (2006.01)
*H01M 2/08* (2006.01)

(52) U.S. Cl.
CPC ............... *H01M 2/06* (2013.01); *H01M 2/08* (2013.01); *Y10T 29/49108* (2015.01)

(58) Field of Classification Search
CPC .................................. H01M 2/06; H01M 2/08
See application file for complete search history.

(56) References Cited

U.S. PATENT DOCUMENTS

| | | | |
|---|---|---|---|
| 4,129,690 A | 12/1978 | Jones et al. |
| 4,233,372 A | 11/1980 | Bro et al. |
| 5,643,694 A | 7/1997 | Heller, Jr. |
| 6,670,074 B2 | 12/2003 | Spillman |
| 7,341,802 B1 | 3/2008 | Ota et al. |
| 7,416,811 B2 | 8/2008 | Nakahara et al. |
| 8,932,750 B2 | 1/2015 | Cooley et al. |
| 9,209,438 B2 | 12/2015 | Pollack et al. |
| 9,281,507 B2 | 3/2016 | Bruch et al. |
| 2003/0096162 A1 | 5/2003 | Lasater et al. |
| 2003/0134194 A1 | 7/2003 | Lasater |
| 2004/0191621 A1 | 9/2004 | Heller, Jr. |

(Continued)

OTHER PUBLICATIONS

International Search Report and Written Opinion received in PCT/IB2017/050059 dated Apr. 21, 2017 (12 pages).

(Continued)

*Primary Examiner* — Jane J Rhee
(74) *Attorney, Agent, or Firm* — Alston & Bird LLP

(57) ABSTRACT

In a feedthrough device and method of assembly thereof, a body has longitudinally spaced first and second end faces and an inner surface defining a longitudinally extending opening. A conductor extends within the opening and an insulator extends within the opening transversely intermediate the conductor and the inner surface of the body to insulate the conductor from the body. The body has at least one indentation formed longitudinally into at least one of the first and second end faces, with a portion of the inner surface of the body being displaced transversely against the insulator in correspondence with the at least one longitudinal indentation to crimp the insulator and conductor within the opening of the body and maintain a hermetic seal across the feedthrough device.

17 Claims, 4 Drawing Sheets

(56) References Cited

U.S. PATENT DOCUMENTS

| | | |
|---|---|---|
| 2005/0255380 A1 | 11/2005 | Lasater et al. |
| 2008/0038634 A1 | 2/2008 | Bushong et al. |
| 2008/0210455 A1 | 9/2008 | Pollack et al. |
| 2012/0152611 A1 | 6/2012 | Fisher et al. |
| 2014/0272544 A1 | 9/2014 | Bruch et al. |
| 2014/0315075 A1 | 10/2014 | Bilek et al. |
| 2017/0149028 A1 | 5/2017 | Kroll et al. |

OTHER PUBLICATIONS

International search report issued for PCT/IB2017/050059, dated Apr. 21, 2017.
Non-Final Rejection Office Action on U.S. Appl. No. 14/192,558 dated Jul. 7, 2016 (9 pages).
Notice of Allowance on U.S. Appl. No. 14/192,558 dated Jul. 7, 2017 (8 pages).

FEEDTHROUGH DEVICE

CROSS-REFERENCE TO RELATED APPLICATIONS

This application is a continuation application of U.S. patent application Ser. No. 14/192,558, filed on Feb. 27, 2014, which in turn claims the benefit of U.S. Provisional Patent Application No. 61/777,777, filed Mar. 12, 2013, the entire disclosures of which are incorporated herein by reference in their entirety.

BACKGROUND

The present invention relates generally to a feedthrough device and, more particularly, to a hermetic electrical feedthrough device.

A feedthrough device is an electrical device that is used to transmit electricity through a wall, typically the wall of a sealed housing. For example, in some instances, a feedthrough device may be utilized to transmit electricity through a wall of an electro-chemical housing (e.g., a terminal extending into a battery), a wall of a heated housing (e.g., a thermocouple extending into a furnace), a wall of pressurized housing (e.g., a communication link extending into a submersible vessel), or the like. As such, in some applications, a feedthrough device may experience a harsh environment on at least one side of the wall through which it extends (e.g., the feedthrough device may be exposed to corrosive matter, increased pressure, and/or increased temperature on the inside of the sealed housing).

There is a need, therefore, for a feedthrough device that enables the transfer of electricity through a wall of a housing and effectively withstands the harsh environment within the housing to prevent the transfer of other matter into, and out of, the housing, while minimizing manufacturing time and cost.

SUMMARY

In one embodiment, a feedthrough device generally comprises a body having longitudinally spaced first and second end faces and an inner surface defining an opening extending longitudinally through the body. A conductor extends within the opening of the body and an insulator extends within the opening of the body transversely intermediate the conductor and the inner surface of the body to insulate the conductor from the body. The body has at least one indentation formed longitudinally into at least one of the first and second end faces, with a portion of the inner surface of the body being displaced transversely against the insulator in correspondence with the at least one longitudinal indentation to crimp the insulator and conductor within the opening of the body and maintain a hermetic seal across the feedthrough device.

In one embodiment of a method of fabricating a feedthrough device, an elongated conductor is surrounded with an insulator. The conductor and insulator are together inserted through a longitudinally extending opening in a body on which the feedthrough device is to be mounted. The body has longitudinally spaced end faces and an inner surface extending therebetween and defining the longitudinally extending opening. The insulator insulates the body from the conductor. At least one longitudinally extending indentation is formed into at least one of the longitudinal end faces, with the indentation being configured such that longitudinal displacement of material of the body at the indentation causes transverse displacement of material of the body at the inner surface of the body to crimp the insulator and the conductor within the opening of the body and maintain a hermetic seal across the feedthrough device.

In yet another embodiment, a feedthrough device generally comprises a body having longitudinally spaced first and second end faces and an inner surface defining an opening extending longitudinally through the body. A conductor extends within the opening of the body and an insulator extends within the opening of the body transversely intermediate the conductor and the inner surface of the body to insulate the conductor from the body. The body has a first annular indentation formed longitudinally into one longitudinal end face and a second annular indentation formed longitudinally into the other longitudinal end face. A first annular bulge is formed in the inner surface of the body and longitudinally corresponds to the first annular indentation, with the first annular bulge extending transversely of the body opening such that the first annular bulge crimps the insulator and the conductor. A second annular bulge is formed in the inner surface of the body and longitudinally corresponds to the second annular indentation, with the second annular bulge extending transversely of the body opening such that the second annular bulge further crimps the insulator and the conductor.

BRIEF DESCRIPTION

Corresponding reference characters indicate corresponding parts throughout the several views of the drawings.

DETAILED DESCRIPTION

Figure 1:
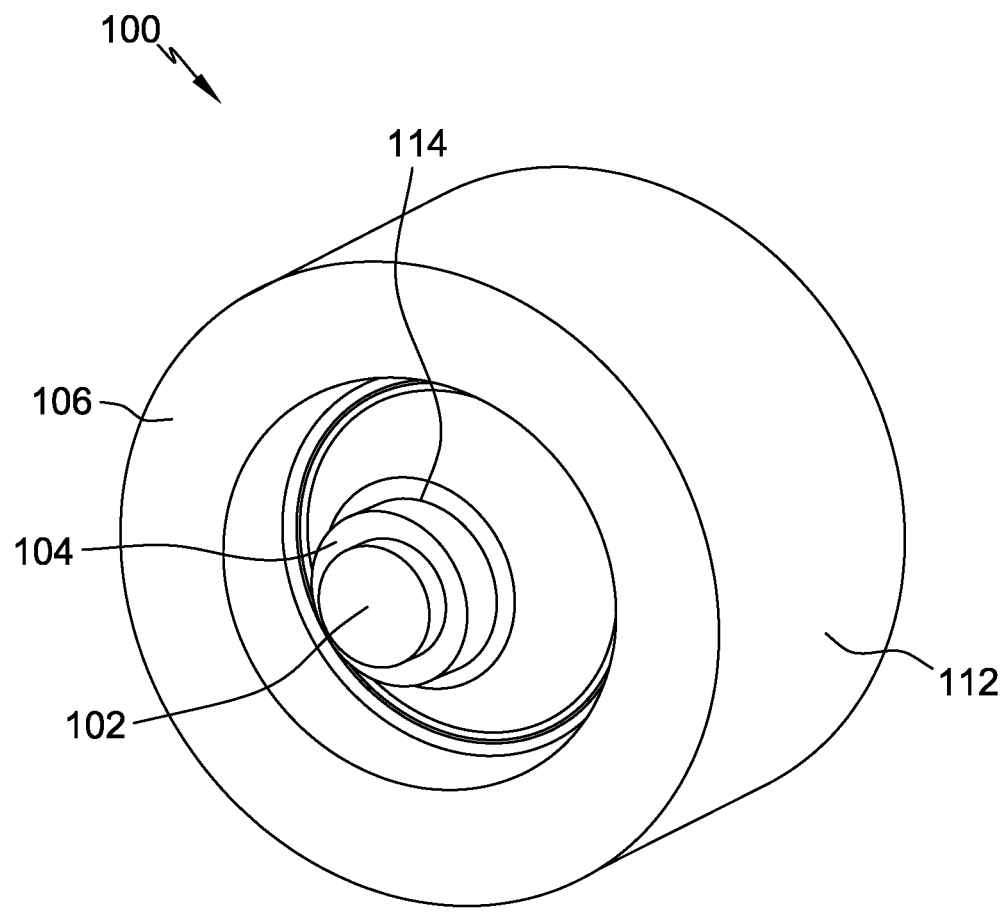
FIG. 1 is a perspective view of one embodiment of a feedthrough device.
Figure 2:
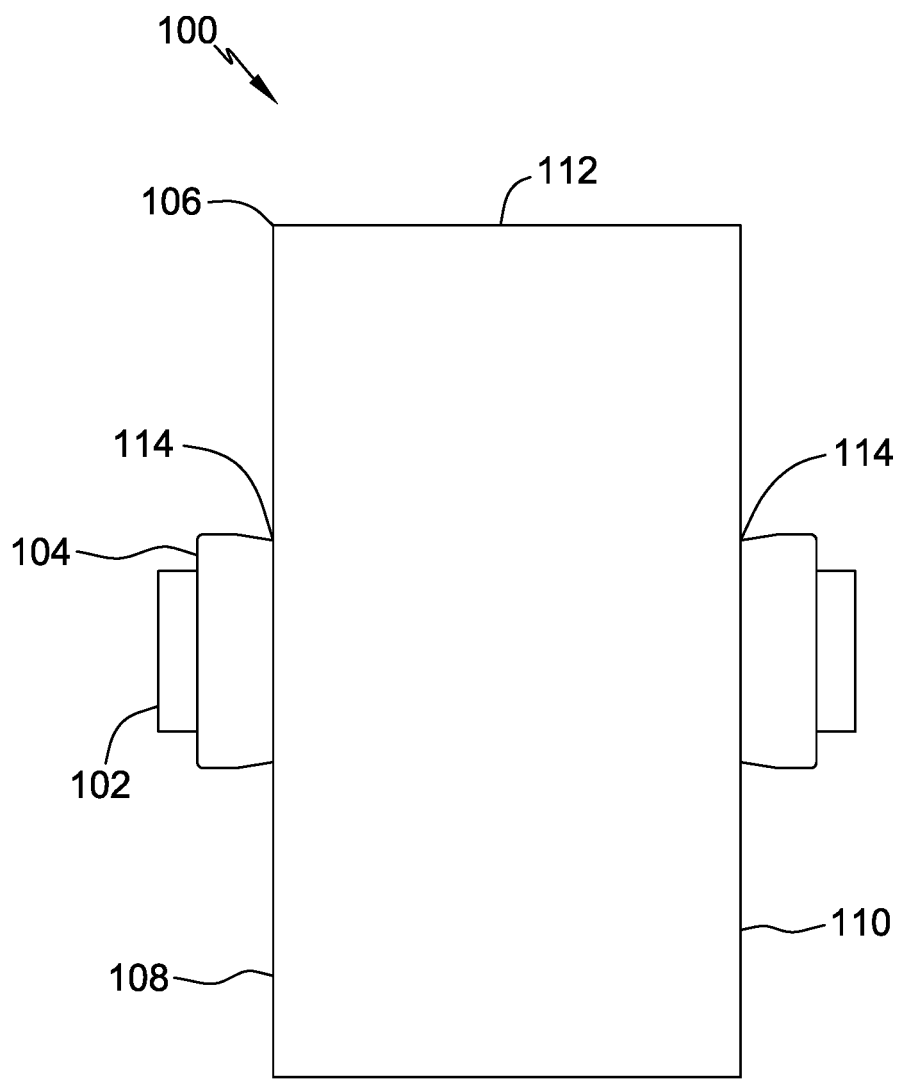
FIG. 2 is a side elevation of the feedthrough device of FIG. 1.
Figure 3:
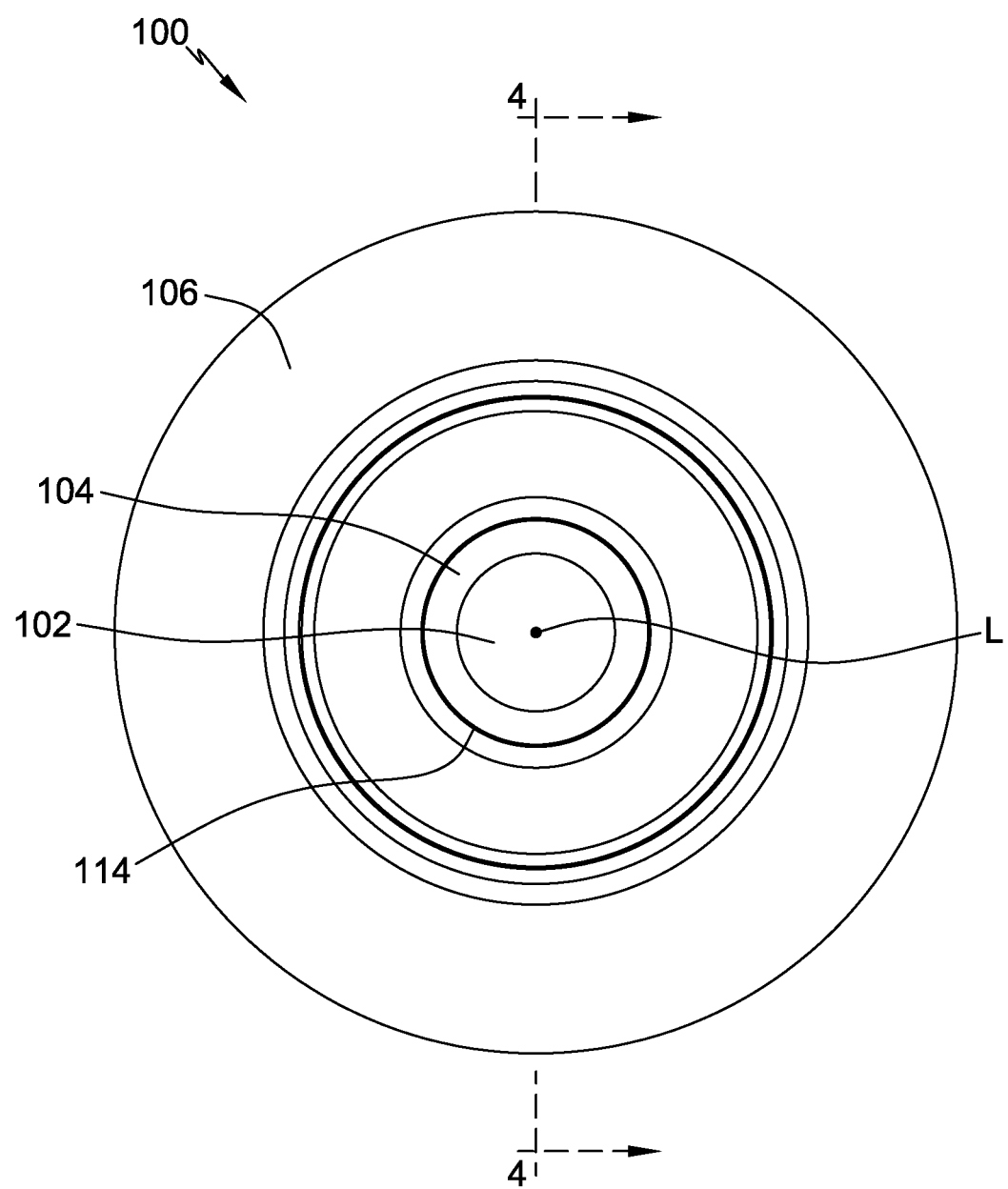
FIG. 3 is a top plan view of the feedthrough device of FIG. 1.

Referring now to the drawings, and in particular to FIGS. 1-3, a feedthrough device according to one embodiment is generally indicated by the reference numeral 100. The feedthrough device 100 includes a conductor 102, an insulator 104 enclosing at least a portion of the conductor 102, and a body 106 enclosing at least a portion of the insulator 104.

In the illustrated embodiment, the body 106 is all or part of a wall of a sealed housing such as, for example, the end wall of a lithium battery cell housing. The body 106 has longitudinal end faces, referred to herein as a first face 108 (e.g., an exterior face of the battery cell housing), and a second face 110 (e.g., an interior face of the battery housing) longitudinally spaced from the first face 108. A third (e.g., transversely outer) face 112 extends longitudinally between the first face 108 and the second face 110 and broadly defines an outer surface of the body. The body 106 also has a longitudinally extending opening 114 therethrough defining an inner surface of the body as well as a longitudinal axis L of the body (FIG. 4).

The conductor 102, the insulator 104, and the inner surface of the body defined by the opening 114 have a cross-sectional profile that is substantially circular (FIG. 3). However, in other embodiments the conductor 102 (as well as the insulator 104 and the inner surface of the body 106) may have any cross-sectional shape such as, for example, a square, a rectangle, a pentagon, a hexagon, an octagon, or other suitable shape. While the opening 114 is substantially centrally located on the body 106 in the illustrated embodiment, the opening 114 may be located elsewhere on the body 106 without departing from the scope of this invention.

As used herein, the term "inner," "inward," or any variation thereof is a directional modifier referring to a disposition that is relatively closer to the longitudinal axis L, and the term "outer," "outward," or any variation thereof is a directional modifier referring to a disposition that is relatively further from the longitudinal axis L. Additionally, as used herein, the term "length" or any variation thereof refers to a dimension defined by the longitudinal axis L, and the term "width" or any variation thereof refers to a dimension extending perpendicular to the longitudinal axis L. The term "transverse" refers to a direction generally normal to the longitudinal axis L.

Figure 4:
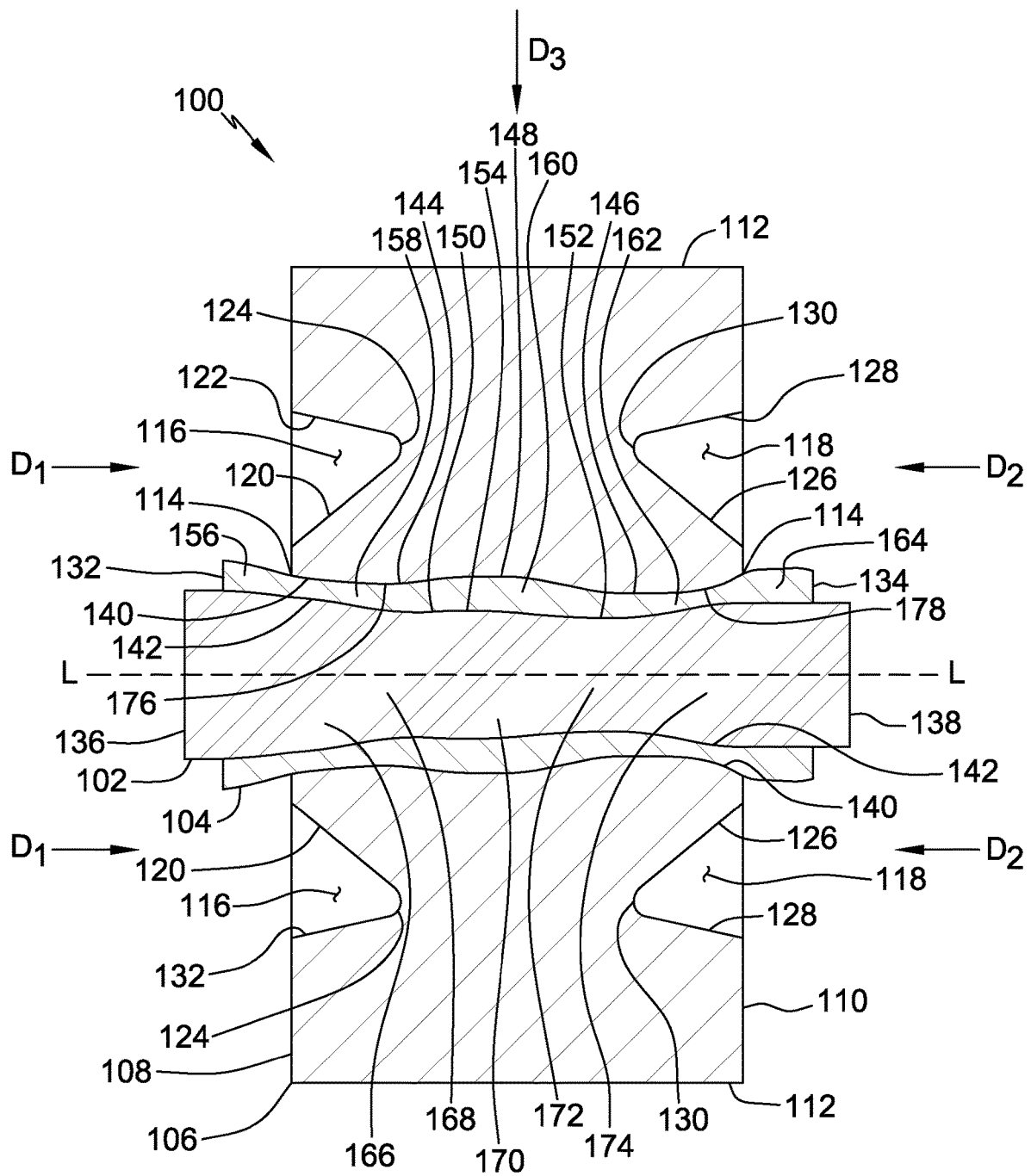
FIG. 4 is a cross-section of the feedthrough device of FIG. 3 taken along plane 4-4.

With reference now to FIG. 4, the conductor 102 and the insulator 104 are received in and extend through the opening 114 of the body 106. A first indentation 116 is formed into the first face 108, and a second indentation 118 is formed in the second face 110, with each of the indentations 116, 118 being annular about the opening 114 (and hence the longitudinal axis L). In other embodiments, the body 106 may have another suitable size and shape (e.g., the body 106 may have a polygonal shape such as, for example, a square or rectangle).

Similarly, the indentations 116, 118 may not be annular in other embodiments (e.g., at least one of the annular indentations 116, 118 may instead be a plurality of arc-shaped indentation segments forming a broken, seemingly scored annulus, or at least one of the indentations 116, 118 may have a plurality of linear or non-linear segments that are arranged about the opening 114). Alternatively, the body 106 may have any suitable configuration that enables the feedthrough device 100 to function as described herein. It should also be noted that, as used herein, the phrase "extending circumferentially about" or any variation thereof refers to extending about the perimeter of an object having any suitable shape (e.g., a square, a rectangle, a triangle, etc.) and is not limited to extending about the perimeter of an object having a circular shape.

The illustrated first indentation 116 extends generally longitudinally into the first face 108 of the body 106 and more particularly has a generally V-shaped contour that is defined at least in part by a first inner segment 120 and a first outer segment 122 that are joined together at a first vertex 124. The first inner segment 120 has a generally linear contour and is oriented obliquely relative to the longitudinal axis L.

Similarly, the illustrated second indentation 118 extends generally longitudinally into the second face and has a generally V-shaped contour that is defined at least in part by a second inner segment 126 and a second outer segment 128 that are joined together at a second vertex 130. The second inner surface 126 also has a generally linear contour and is oriented obliquely relative to the longitudinal axis L. Notably, in the illustrated embodiment, the oblique orientation of the first inner segment 120 and the second inner segment 126 relative to the longitudinal axis L facilitates displacement of material of the body 106, and more particularly the inner surface of the body at the opening 114, transversely inward toward the longitudinal axis L.

More particularly, a V-shaped crimping tool is pressed into each of the first and second faces 108, 110 to form the indentations 116, 118 as described in more detail below. Also, each of the first indentation 116 and the second indentation 118 is sized to have a length (e.g., from its respective face 108, 110 longitudinally to its respective vertex 124, 130) of about one-fourth of a length of the body 106 as measured from the first face 108 to the second face 110 at the opening (e.g., the length of the inner surface of the body). In other embodiments, the indentations 116, 118 may have any suitable contour and/or length that facilitates enabling the body 106 to function as described herein.

The illustrated conductor 102 and insulator 104 extend through the opening 114 of the body 106 with the insulator 104 enclosing (e.g., extending circumferentially about) at least a portion of the conductor 102 such that the insulator 104 is disposed between the conductor 102 and the body 106 to insulate the body from the conductor. The insulator 104 has a first end 132 and a second end 134, with the first and second ends 132, 134 of the insulator extending longitudinally outward of the body 106 at the opposite ends of the opening 114. The illustrated conductor 102 also has opposite first and second ends 136 that extend longitudinally outward of the body 106 at the opening 114, and more particularly longitudinally outward beyond the ends 132, 134 of the insulator 104. Additionally, the illustrated body 106 has a length (from the first face 108 to the second face 110) that is about two-times to three-times a width of the conductor 102 as measured before any crimping operation that deforms the conductor 102.

As such, the insulator 104 contacts the body 106 along an annular outer contact zone 140 extending longitudinally from the first face 108 to the second face 110 of the body 106 (e.g., along the inner surface defined by the opening 114). The insulator 104 contacts the conductor 102 along an annular inner contact zone 142 extending from the first end 132 of the insulator 104 to the second end 134 thereof. In the illustrated embodiment, the outer contact zone 140 between the insulator 104 and inner surface of the body 106 has an undulating contour along its length that includes: a first outer valley segment 144 adjacent the first face 108 of the body 106; a second outer valley segment 146 adjacent the second face 110 of the body 106; and an outer peak segment 148 disposed axially between the first outer valley segment 144 and the second outer valley segment 146.

Similarly, the illustrated inner contact zone 142 has an undulating contour along its length that includes: a first inner valley segment 150 adjacent the first face 108 of the body 106; a second inner valley segment 152 adjacent the second face 110 of the body 106; and an inner peak segment 154 disposed axially between the first inner valley segment 150 and the second inner valley segment 152. In other embodiments, the outer contact zone 140 and/or the inner contact zone 142 may have any suitable contours (e.g., any suitable arrangement of peaks and valleys) that facilitate enabling the insulator 104 to function as described herein.

In addition to the insulator 104 having contact zones 140, 142 that undulate, a width of the insulator 104, as measured from the inner contact zone 142 to the outer contact zone 140, varies along its length from the first end 132 to the second end 134 of the insulator 104. More specifically, in longitudinally sequential order from the first end 132 to the second end 134 of the insulator 104, the width of the insulator 104 varies as follows: a first wider region 156; a first narrower region 158; an intermediate wider region 160; a second narrower region 162; and a second wider region 164. The first narrower region 158 and the second narrower region 162 are narrower than the first wider region 156, the intermediate wider region 160, and the second wider region 164.

In the illustrated embodiment, the first wider region 156 of the insulator 104 extends from the first end 132 of the insulator 104 to the first face 108 of the body 106, and the second wider region 164 of the insulator 104 extends from the second end 134 of the insulator 104 to the second face 110 of the body 106 (i.e., the insulator 104 is wider outside of the channel 114 of the body 106 than at the first and second faces 108, 110 of the body 106). Additionally, the intermediate wider region 160 of the insulator 104 is confined, in its axial extension, to an area between the vertices 124, 130 of the indentations 116, 118 and, therefore, extends through the outer and inner peak segments 148, 154 of the outer and inner contact zones 140, 142, respectively.

As such, the first narrower region 158 corresponds generally with the first inner segment 120 of the first indentation 116 and, therefore, extends through the first inner valley segment 150 and the first outer valley segment 144. Similarly, the second narrower region 162 corresponds generally with the second inner segment 126 of the second indentation 118 and, therefore, extends through the second inner valley segment 152 and the second outer valley segment 146. In other embodiments, the width of the insulator 104 may have any suitable number of narrower regions and wider regions arranged in any suitable manner along its length and having any suitable widths relative to one another that facilitates enabling the insulator 104 to function as described herein. Additionally, in order to facilitate optimal deformation (e.g., compression) of material in the conductor 102, the insulator 104 and the body 106 during the crimping operation described below, the illustrated insulator 104 has a width (from the inner contact zone 142 to the outer contact zone 140) of about half of the width of the conductor 102 before the crimping operation is performed.

Similar to the insulator 104, the width of the conductor 102 also varies axially from the first end 132 to the second end 134 of the insulator 104. More specifically, in longitudinally sequential order from the first end 132 to the second end 134 of the insulator 104, the width of the conductor 102 varies as follows: a first wider region 166 longitudinally aligned with the first wider region 156 of the insulator 104; a first narrower region 168 longitudinally aligned with the first narrower region 158 of the insulator 104; an intermediate wider region 170 longitudinally aligned with the intermediate wider region 160 of the insulator 104; a second narrower region 172 longitudinally aligned with the second narrower region 162 of the insulator 104; and a second wider region 174 longitudinally aligned with the second wider region 164 of the insulator 104. Alternatively, the width of the conductor 102 may have any suitable number of narrower regions and wider regions along the length of the insulator 104 and be arranged in any suitable manner that facilitates enabling the conductor 102 to function as described herein.

In the illustrated embodiment, the conductor 102 and/or the body 106 are fabricated from an electrically conductive material such as, for example, any one (or combination of) the following metallic materials: stainless steel; nickel; titanium; gold; silver; platinum; niobium; molybdenum; aluminum; tin; copper; brass; bronze; zinc; and invar or another nickel alloy (such as the "Monel" material or the "Inconel" material available from Special Metals Corporation). For purposes described in more detail below, the material composition of the illustrated conductor 102 and the illustrated body 106 are sufficiently ductile so as to permit material deformation upon crimping, while also having a sufficiently low elastic modulus so as to inhibit material spring-back after the deformation that results from the crimping. In other embodiments, the conductor 102 and the body 106 may be fabricated from any suitable materials that facilitate enabling the conductor 102 and the body 106 to function as described herein.

The illustrated insulator 104 is fabricated from an electrically non-conductive polymeric material composition that exhibits superior mechanical, thermal, and chemical properties, such as, for example, any one (or combination of) the following polymeric materials: polyvinylidene fluoride (PVDF); polytetrafluoroethylene (PTFE); polysulfone (PSU); polyether ether ketone (PEEK); chlorotrifluoroethylene (CTFE); fluorinated ethylene propylene (FEP); perfluoroalkoxy (PFA); a blend of polyphenylene oxide (PPO) and polystyrene (PS) (such as the "Noryl" material available from Sabic); polyetherimide (PEI); polyphenylene sulfide (PPS); and a polyimide (PI) film (such as the "Kapton" material or the "Cirlex" material available from DuPont). Alternatively, the insulator 104 may be fabricated from any suitable material that facilitates enabling the insulator 104 to function as described herein.

To assemble the feedthrough device 100, the conductor 102 and the insulator 104 are inserted through the opening 114 of the body 106 such that the insulator 104 separates (i.e., insulates) the body from the conductor along the entire inner surface of the body at the opening. Upon initial insertion of the conductor 102 and insulator 104 through the opening 114, the respective widths of the conductor 102 and insulator are uniform at least along the length of the inner surface of the body 106. In other words, if the feedthrough device 100 was to be viewed from the cross-sectional viewpoint of FIG. 4 prior to the crimping operation described below, the inner and outer contact zones 140, 142 would be substantially linear and thus parallel to the inner surface of the body and hence the longitudinal axis L (i.e., the contact zones 140, 142 would not undulate in the manner illustrated in FIG. 4).

After insertion of the conductor 102 and the insulator 104 through the opening 114, a first crimping tool (not shown) having an annular, generally V-shaped contour (mirroring the contour of the first indentation 116) is pressed into the first face 108 in a first direction $D_1$ (i.e., longitudinally) that is substantially parallel to the longitudinal axis L. Because the material composition of the body 106 is sufficiently ductile, the configuration of the first crimping tool forms the first indentation 116 into the first face and results in displacing material of the body 106 at the inner surface of the body transversely inward toward the longitudinal axis L. This causes a first transverse annular bulge 176 in the inner surface of the body 106. The first transverse annular bulge 176 deforms (e.g., compresses and/or displaces) material of the insulator 104 and the conductor 102, thereby crimping the feedthrough device 100 near the first face 108 of the body 106.

More particularly, this crimping action forms the first outer valley segment 144 of the outer contact zone 140 and the first inner valley segment 150 of the inner contact zone 142 such that the first narrower region 158 longitudinally correspond with the first inner segment 120 of the first indentation 116. In other embodiments, the contour of the first crimping tool that is pressed into the first face 108 of the body 106 may not be annular but, rather, may be configured to suit other desirable patterns of the first indentation 116, as set forth above. Additionally, the first crimping tool may be pressed into the first face 108 in any suitable direction that facilitates displacing material of the body 106 as described herein (e.g., a direction that is other than substantially parallel to the longitudinal axis L).

Either before, after, or simultaneous to crimping the feedthrough device 100 by forming the first indentation 116, a second crimping tool (not shown) having an annular, generally V-shaped contour (mirroring the contour of the second indentation 118) is also pressed into the second face 110 in a second direction $D_2$ (e.g., longitudinally) that is substantially parallel to the longitudinal axis L. Again, because the material composition of the body 106 is sufficiently ductile, the second crimping tool forms the second indentation 118 in the second face 110 and results in in displacing material of the body 106 at the inner surface of the body transversely inward toward the longitudinal axis L. This causes a second transverse annular bulge 178 in the inner surface of the body 106. Forming this second annular bulge 178 deforms (e.g., compresses and/or displaces) material of the insulator 104 and the conductor 102, thereby crimping the feedthrough device 100 near the second face 110 of the body 106.

This crimping action forms the second outer valley segment 146 of the outer contact zone 140 and the second inner valley segment 152 of the inner contact zone 142 such that the second narrower region 162 is longitudinally aligned with the second inner surface 126 of the second indentation 118. In other embodiments, the contour of the second crimping tool that is pressed into the second face 110 of the body 106 may not be annular but, rather, may be configured to suit other desirable patterns of the second indentation 118, as set forth above. Additionally, the second crimping tool may be pressed into the second face 110 in any suitable direction that facilitates displacing material of the body 106 as described herein (i.e., a direction that is other than substantially parallel to the longitudinal axis L).

Notably, the first crimping tool and the second crimping tool may be one and the same (i.e., a single crimping tool may be used to indent both the first face 108 and the second face 110). Also, it is contemplated that in some alternative embodiments one of the first face 108 and the second face 110 may not be indented (i.e., the insulator 104 and the conductor 102 may be crimped by indenting only one of the first face 108 and the second face 110, thereby forming only one of the annular bulges 176, 178 within the opening 114). Moreover, it should be noted that while the bulges 176, 178 are annular in the illustrated embodiment due to the indentations 116, 118 being annular, the bulges 176, 178 may not be annular in other embodiments but, rather, may have configurations that suit alternative, non-annular indentation configurations, as set forth above.

As a result of these crimping operations, the intermediate wider region 160 of the insulator 104 is disposed longitudinally between the first and second narrower regions 158, 162 of the insulator 104 such that at least a portion of the intermediate wider region 160 of the insulator 104 is confined by the first annular bulge 176 and the second annular bulge 178 of the body 106. Additionally, the intermediate wider region 170 of the conductor 102 is also disposed longitudinally between the first and second narrower regions 158, 162 of the insulator 104 such that at least a portion of the intermediate wider region 170 of the conductor 102 is confined by the first narrower region 158 and the second narrower region 162 of the insulator 104.

Moreover, because the first and second wider regions 156, 164 of the insulator 104 (which are disposed exterior of the opening 114) are too wide to fit into the opening 114 after crimping (i.e., due, at least in part, to material of the insulator 104 being displaced longitudinally from within the opening 114 to exterior of the body 106), the first wider region 156 of the insulator 104 is kept to the exterior of the body 106 by the first face 108, and the second wider region 164 of the insulator 104 is kept to the exterior of the opening 106 by the second face 110.

With this arrangement, movement of the conductor 102, the insulator 104 and the body 106 relative to one another parallel to the longitudinal axis L (e.g., during thermal cycling due to creep or thermal expansion) is inhibited, and a hermetic seal is maintained across the feedthrough device 100 through the opening 114 of the body 106. Yet, despite this, the insulator 104 (e.g., the first narrower region 158 of the insulator 104 and the second narrower region 162 of the insulator 104) is still able to expand and contract to suit differences in coefficients of thermal expansion that may exist between the material composition of the conductor 102 and the material composition of the body 106 (i.e., in some embodiments, the body 106 may be fabricated from a first metallic material, and the conductor 102 may be fabricated from a second metallic material that is different than the first metallic material). Optionally, the inner surface of the body 106 along the outer contact zone 140, and/or the surface of the conductor 102 along the inner contact zone 142, may be roughened (e.g., via sandblasting, sanding, knurling, or peening) to further assist in inhibiting relative movement of the body 106, the insulator 104 and the conductor 102 along the longitudinal axis L after crimping.

In this manner, the feedthrough device 100 enables electrical transmission through a body (e.g., a wall of a housing) while preventing the transfer of gas, liquid, or solid matter through the body. Due to the geometry of the indentations 116, 118 formed the crimping tool, and the location of the resultant deformation (e.g., compression) of the insulator 104, the feedthrough device 100 is able to accommodate the use of electrically conductive materials with different thermal expansion coefficients while maintaining hermeticity upon thermal cycling. The feedthrough device 100 also offers improved chemical resistance due to the wider array of metallic material compositions that are available for the body 106 and the conductor 102, and due to the wider array of polymeric material compositions that are available for the insulator 104. The materials and processes described herein for fabricating the feedthrough device 100 are relatively inexpensive, thus resulting in a low-cost assembly.

An additional benefit associated with the feedthrough device 100 is that the body 106 may be integrally formed as one with an object through which electrical transmission is desired (e.g., the body 106 may itself be the wall of the housing such as a battery cell housing into which electricity is to be transmitted, as opposed to the body 106 being formed separately from, and coupled to, the wall of the housing). This is possible because, as opposed to having the indentations 116, 118 formed in the third face 112 (e.g., outer surface) of the body 106 (i.e., as opposed to the crimping tool(s) being pressed transversely into the body 106 in a direction $D_3$ that is substantially perpendicular to the longitudinal axis L of the channel 114), the indentations 116, 118 are formed longitudinally into the first and second faces 108, 110 (i.e., the crimping tool(s) are pressed into the body 106 in directions $D_1$, $D_2$ that are substantially parallel to the longitudinal axis L of the channel 114), meaning that the crimping operation can occur after the conductor 102 and the insulator 104 have already been inserted through the wall of the housing into which electricity is desired to be transmitted. Hence, in the illustrated embodiment, the third face 112 of the body 106 is not indented transversely for the purpose of crimping the conductor 102 and the insulator 104 (i.e., the third face 112 is free from an indentation that results in crimping of the insulator 104 and the conductor 102). In this manner, the feedthrough device 100 described herein facilitates eliminating the need for a body that is separate from, and coupled to, the wall of the housing after crimping.

The feedthrough device 100 described herein also alleviates various limitations associated with glass-to-metal seals and hermetic epoxy seals in feedthrough devices. More specifically, glass-to-metal feedthrough devices require that the housing and the conductive element have closely matched thermal expansion coefficients to that of the glass in order to prevent damage to the seal upon thermal cycling. As a result, in feedthrough devices having glass-to-metal seals, only a narrower array of materials is available for use as the material composition of the body, of which aluminum and other metals having higher coefficients of thermal expansion are likely excluded. Similarly, when compared to the feedthrough device described herein, feedthrough devices having epoxy seals are also limited in chemical compatibility across a narrower temperature range.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A feedthrough device comprising:
a body defining a longitudinal axis and having longitudinally spaced first and second end faces and an inner surface defining an opening extending along the longitudinal axis through the body;
a conductor extending within the opening of the body;
an insulator extending within the opening of the body transversely intermediate the conductor and the inner surface of the body to insulate the conductor from the body;
at least one indentation formed longitudinally into at least one of the first and second end faces of the body; and
at least one annular bulge formed in the inner surface of the body and extending transversely of the body opening such that the annular bulge crimps the insulator and the conductor to form a hermetic seal, wherein at least a portion of the at least one annular bulge is longitudinally aligned with at least a portion of the at least one indentation.

2. The feedthrough device set forth in claim 1 wherein the device is for a battery cell having a housing including a wall, the body of the feedthrough device comprising at least part of the wall of the battery cell housing.

3. The feedthrough device set forth in claim 1 wherein the indentation is annular.

4. The feedthrough device set forth in claim 1 wherein the indentation is generally V-shaped.

5. The feedthrough device set forth in claim 1 wherein the inner surface of the body contacts the insulator along a longitudinal contact zone having a length along the opening, the contact zone having an undulating contour along its length.

6. The feedthrough device set forth in claim 5 wherein the insulator comprises at least one wider region in transverse cross-section and at least one narrower region in transverse cross-section, the at least one narrower region of the insulator being narrower than the at least one wider region of the insulator.

7. The feedthrough device set forth in claim 6 wherein the conductor contacts the insulator along a longitudinal contact zone therebetween having a length along the opening, the contact zone between the conductor and the insulator having an axially undulating contour along its length.

8. The feedthrough device set forth in claim 1 wherein the body further comprises an outer surface extending at least in part longitudinally between the first and second faces of the body in transversely spaced relationship with the inner surface, the outer surface of the body being free from an indentation that corresponds to crimping of the insulator and the conductor.

9. The feedthrough device set forth in claim 1 wherein the body is fabricated from a first metallic material, the conductor is fabricated from a second metallic material different than the first metallic material, and the insulator is fabricated from a polymeric material.

10. A method of fabricating a feedthrough device, the method comprising:
surrounding an elongated conductor with an insulator;
inserting the conductor and insulator together through a longitudinally extending opening in a body on which the feedthrough device is to be mounted, the body having longitudinally spaced end faces and an inner surface extending therebetween and defining the longitudinally extending opening, the insulator electrically insulating the body from the conductor; and
forming at least one longitudinally extending indentation into at least one of the longitudinal end faces; and
forming at least one annular bulge in the inner surface of the body, wherein the at least one annular bulge extends transversely of the body opening such that the annular bulge crimps the insulator and the conductor to form a hermetic seal and at least a portion of the annular bulge is longitudinally aligned with at least a portion of the at least one longitudinally extending indentation.

11. The method set forth in claim 10 wherein the at least one longitudinally extending indentation is formed substantially parallel to the longitudinally extending opening of the body.

12. The method set forth in claim 10 wherein the insulator extends longitudinally outward of the opening beyond the longitudinal end faces of the body.

13. The method set forth in claim 10 wherein forming at least one longitudinally extending indentation into at least one-of the longitudinal end faces comprises forming at least one longitudinally extending indentation that is generally V-shaped.

14. The method set forth in claim 10 wherein forming the at least one longitudinally extending indentation causes a transverse displacement of material of the body at the inner surface of the body and a transverse deformation of the insulator.

15. The method set forth in claim 14 wherein the transverse displacement of material of the body at the inner surface of the body creates an axially undulating contact zone between the insulator and the body.

16. The method set forth in claim 10 wherein the at least one longitudinally extending indentation causes a transverse displacement of material of the body at the inner surface of the body and a transverse deformation of the conductor.

17. The method set forth in claim 10 wherein the body further has an outer surface extending longitudinally between the longitudinal end faces in transversely spaced relationship with the inner surface, the method further comprising leaving the outer surface free of indentations that result in crimping of the insulator and conductor.

\* \* \* \* \*